Patented May 29, 1951

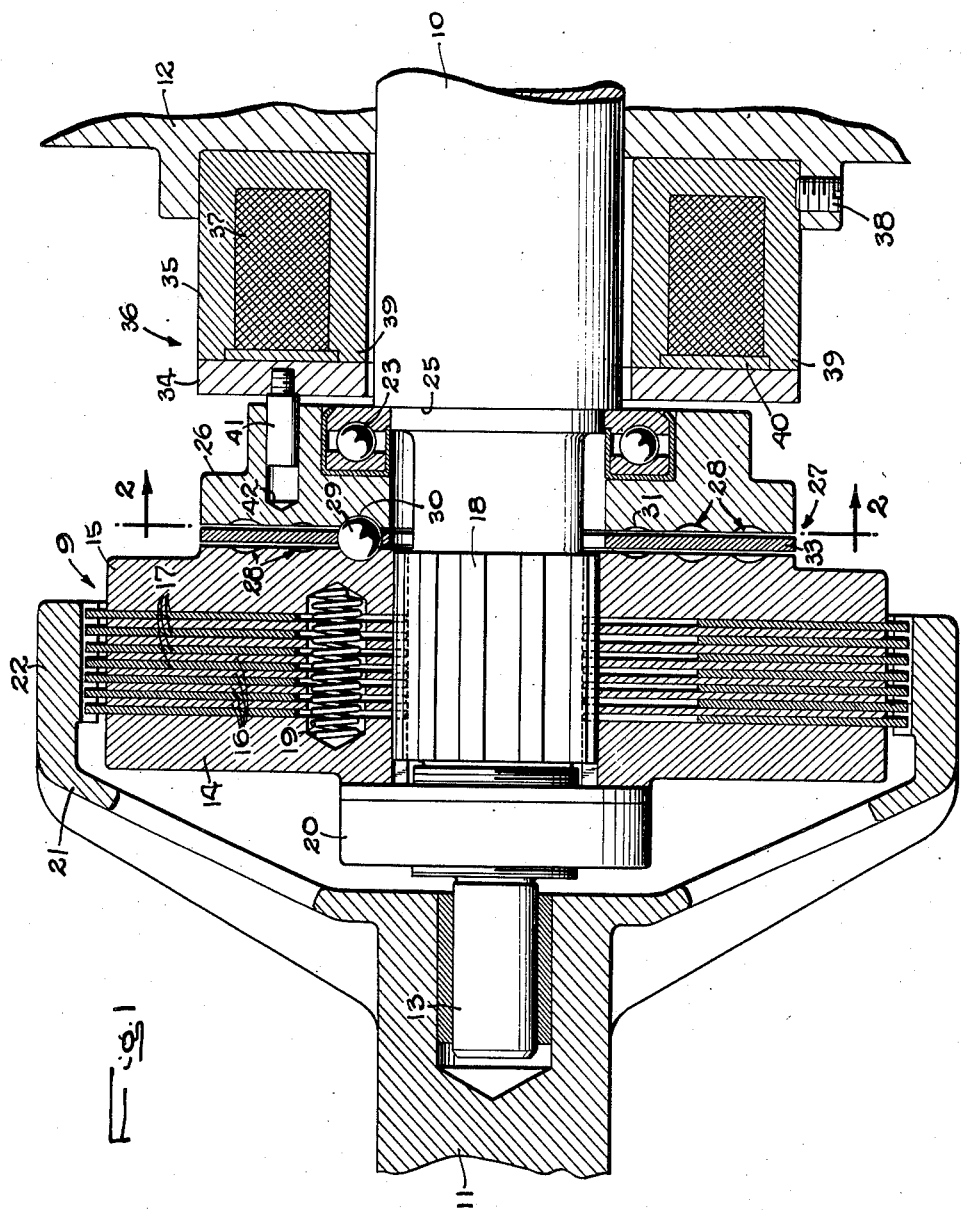

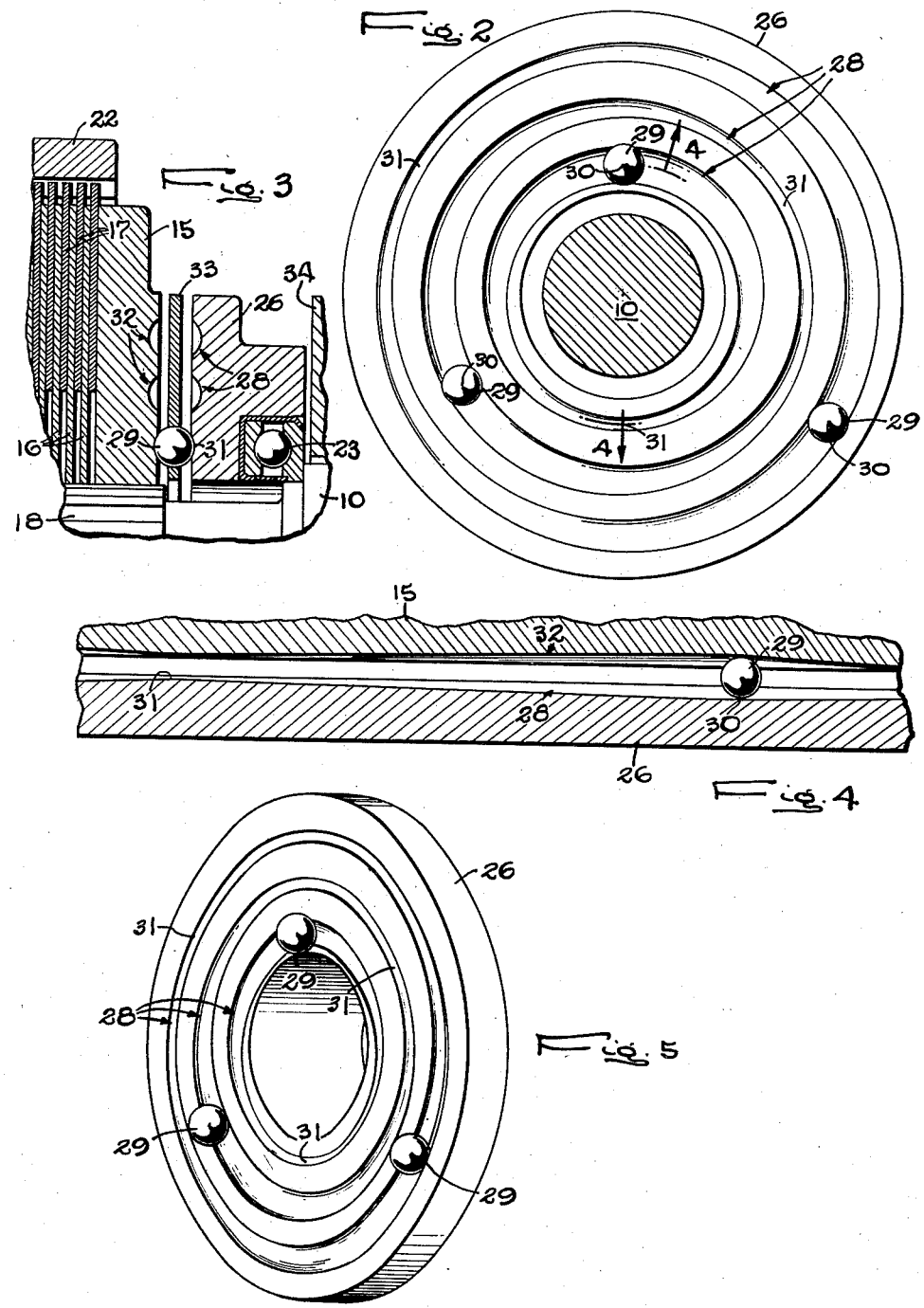

2,555,215

UNITED STATES PATENT OFFICE 2,555,215

MAGNETICALLY CONTROLLED FRICTION CLUTCH

Arthur P. Warner, Beloit, Wis.

Application May 25, 1949, Serial No. 95,273

1 Claim. (Cl. 192—35)

This invention relates to friction clutches of the type in which the force for engaging the main friction clutch is derived from the rotation of the driving clutch element by exerting a magnetically derived drag on a part which normally rotates with said driving element but is rotatable relative to the latter to cause the engaging action. More particularly, the invention is concerned with a drag type clutch in which the main friction clutch is normally disengaged and is engaged by the action of a cam in response to the energization of a nonrotatable magnetic friction element which grips and produces a drag on a normally rotatable coacting friction element. After the latter element has turned relative to the driving member far enough to engage the main clutch, the magnetic friction elements slip relative to each other while remaining under the magnetic gripping force until it is desired to release the main clutch.

The primary object of the present invention is to provide a drag clutch of the above character incorporating a novel and efficient cam actuator by which wear on the drag producing elements is reduced to a minimum.

The invention also resides in the novel arrangement of the actuating and drag producing elements to contribute simplicity of construction and over-all compactness to the clutch unit as a whole.

Other objects and advantages of the invention will become apparent from the following detailed description taken in connection with the accompanying drawings, in which Figure 1 is a longitudinal diametrical cross section of a clutch embodying the novel features of the present invention.

Fig. 2 is a cross section taken along the line 2—2 of Fig. 1.

Fig. 3 is a fragmentary section of a part of Fig. 1 with the parts in clutch actuated position.

Fig 4 is a fragmentary section taken along the line 4—4 of Fig. 2.

Fig. 5 is a perspective view of part of the cam actuator.

The invention is shown in the drawings for purposes of illustration embodied in a clutch or coupling of the multiple disk friction type for transmitting rotary power from a driving element such as a shaft 10 to a driven element such as a shaft 11. The latter is alined with the driver which is journaled in suitable bearings in a stationary support 12 and has a reduced outer end 13 journaled in a bearing in the driven shaft 11.

The main or multiple disk clutch 9 has a plurality of plates or disks 14, 15, 16, and 17 arranged coaxially and composed of suitable metal or friction material. The disks 14, 15, and 16 are splined onto a toothed portion 18 of the driving shaft 10, and the disks 14 and 15 are urged apart by a plurality of annularly spaced compression springs 19. A nut 20 screwed onto the shaft 10 forms a rigid backing for the terminal disk 14. The driven shaft 11 is integral with the centers of a bell-shaped casing 21 whose outer cylindrical flange 22 encloses the clutch disks and is internally splined to mesh with the disks 17.

Journaled on an antifriction bearing 23 on the driving shaft 10 is an actuating disk 26 disposed adjacent to but axially spaced from the terminal clutch disk 15. The bearing 23 is of the thrust type and is backed by a shoulder 25 on the drive shaft. Thus, the actuating disk 26 may rotate with the driving shaft 10 but is adapted to turn relative thereto in either direction away from a normal clutch-released position.

In accordance with the present invention, a novel and extremely efficient force augmenting connection 27 is provided for converting the angular motion of the disk 26 relative to the driving shaft 10 into axial movement of the terminal clutch plate 15 thereby compressing the driving and driven clutch plates 14 and 15 together to engage the main clutch 9.

This connection includes a plurality, three in this instance, of concentric grooves in the axial face of the disk 26 having surfaces 28 transversely curved to receive and fit quite closely around one side of hardened balls 29, each surface sloping gradually and circumferentially in opposite directions from a low point 30 to a high point 31. These points are spaced approximately a half revolution apart in this instance in order to provide for actuation of the main clutch by angular displacement of the actuating disk in either direction away from the released position shown in Figs. 1 and 2. The slope of each groove surface is identical so that all of the balls 29 will be advanced equal axial distances for a given angular displacement of the actuating disk 26. Preferably, though not necessarily, the outer or opposing face of the clutch disk 15 is similarly grooved and sloped to form cam surfaces 32 adapted to receive and fit around the opposite sides of the balls 29 and duplicate the surfaces 28 in diameter, size, slope, and positions of the high and low points. It will be apparent that the ball engaging surfaces on one of the disks may, if desired, be made flat in which case provision would be made for holding the balls in a predetermined relation with respect to the other disk.

The high and low points 30 and 31 of the successively smaller grooves 28 are angularly spaced 120 degrees apart and the balls 29 are held in similarly spaced relation by a cage 33 so that the balls engage corresponding portions of the different cam surfaces 28 and 32 in the different angular positions of the actuating disk. Thus, all of the balls always lie in a common plane which is shifted axially and progressively in the clutch engaging direction as the disk 26 is turned away from the clutch released position in which the balls are disposed at the low points of the cam surfaces as shown in Fig. 1. In the reverse turning of the actuating disk 26, the balls ride down the slopes of the cams permitting the clutch disk 15 to move in the clutch-releasing direction, that is, to the right as viewed in Fig. 1. Such reverse turning occurs whenever the disk 26 is free and is produced by the springs 19 of the main clutch acting backwardly through the antifriction cam connection just described.

The present invention contemplates the application of a magnetically derived friction drag to the normally rotating actuator disk 26 to hold the latter back relative to the drive shaft 10 and thus produce relative rotation between the cam disks for causing energization of the main clutch. Preferably, this drag is produced by axial gripping engagement of the elements 34 and 35 of a pilot friction clutch 36 which are drawn together by magnetic attraction in response to energization of a stationarily mounted coil 37. Herein, the magnet ring 35 is concentric with the clutch axis and is secured as by screws 38 to the support 12. It is composed of magnetic material and is U-shaped in cross section to receive the coil 37 and provide concentric pole pieces which terminate in inner and outer pole faces 39 lying in a common plane and flush with segments 40 of nonmagnetic friction material.

The ring 34 is composed of magnetic material and spans the pole faces 39 so as to constitute an armature normally disposed close to and preferably in contact with the friction face of the magnet. To this end, the ring is rigid with angularly spaced pins 41 which project loosely into holes 42 in the back of the actuator disk 26 thereby allowing some freedom of axial movement of the armature.

It will be apparent that when the coil 37 is deenergized, the armature ring 34 will be free to turn with the disk 26 which is held in clutch released position (Figs. 1 and 2) by the action of the springs 19. The disk and armature thus turn with the driving shaft 10 and the main clutch 9 remains released. Now, when the coil is energized, the rings 34 and 35 are drawn together under a force proportional to the magnitude of the energizing current. The frictionally derived torque thus exerted on the actuator disk 26 holds the latter back causing relative angular displacement between the disks 15 and 26. In this movement, the balls 29 ride up the cam inclines and thus wedge the disks 15 and 26 apart until the clearance between the plates of the main clutch has been taken up. Thereupon the clutch rings 34 and 35 start to slip relative to each other, but the magnetically derived drag continues to be applied to the disk 26 so that the plates of the main clutch are compressed under an axially directed force determined by the degree of energization of the magnet and the extremely high mechanical advantage with which the cam actuator operates.

The axial pressure exerted on the main clutch and therefore the torque transmitted by the latter may be varied as desired by changing the energization of the magnet coil thereby producing a corresponding change in the friction drag on the actuator disk 26. When the magnet is fully deenergized, the disk 26 is freed and will be turned reversely back to released position. In this movement which is produced by the action of the springs 19, the balls 29 roll back down the cam inclines and thus relieve the axial pressure on the main clutch plates.

The engaging and releasing action takes place in the same manner irrespective of the direction in which the drive shaft 10 is turned. This is because, in the form shown, the cam surfaces rise circumferentially in opposite directions away from the low points 30.

By mounting the magnet ring 35 stationarily, the usual commutating rings for conducting current to the coil 37 are not required and numerous operating and maintenance difficulties are thereby avoided. The use of a stationary magnet in the drag type clutches heretofore produced has been accompanied by such rapid wearing of the pilot clutch faces as to render the clutch as a whole impracticable from a standpoint of heavy duty service. This is due to the fact that while the main clutch is engaged, the pilot clutch elements 34 and 35 slip relative to each other at the main clutch speed and under the magnetic attractive force which in a heavy duty clutch must be of substantial magnitude.

In my improved clutch as described above, objectionable wearing off of the pilot clutch faces is avoided even during heavy duty service by constructing the cam actuator for amplification of the drag force with such a large mechanical advantage that the maximum axial pressure between the pilot clutch elements 34 and 35 will be so small as to enable the friction faces to withstand long periods of service use without replacement. This is made possible by making the cam surfaces 28 of different sizes so that each may be of substantial arcuate extent, that is, about 180 degrees in the case of a reversing clutch and 360 degrees in the case of a unidirectional clutch. Over such substantial arcs, the slopes of the cam surfaces may be made so very small that an extremely great mechanical advantage may be achieved and this without detracting from the ability of the actuator to effect prompt and full release of the clutch in response to deenergization of the drag producing magnet. This latter action is achieved through the use of the balls 29 as the antifriction elements thereby eliminating rubbing friction between the parts of the cam actuator which thus responds quickly to the force of the springs 19 as soon as the magnet is deenergized.

I claim as my invention:

A friction drag clutch comprising rotary driving and driven members, a friction clutch having axially engageable friction elements mounted on said members including an axially shiftable terminal disk, a second disk axially spaced from said first disk and mounted on said driving member for rotation relative thereto, at least three arcuate axially facing cam surfaces of different diameters but of equal axial pitch formed on the inner face of one of said disks concentric with the disk axis, three balls respectively riding said three surfaces and the opposed face of the other of said disks, a cage disposed between said disks and retaining said balls in uniform angularly spaced relation, said surfaces having low points angularly spaced equal distances apart around the disk to correspond to the spacing of said balls and gradually sloping circumferentially in one direction through more than 120 degrees whereby to wedge said disks apart in response to turning of said second disk in one direction relative to the first disk, a thrust bearing backing said second disk, spring means urging said first disk axially toward said second disk and operable through the medium of said balls to turn the disk toward and return the same to released position in which said balls engage the low points of said cam surfaces, an armature ring mounted on said second disk for rotation therewith but adapted to float axially relative thereto, said ring having a flat axially facing friction face, and a magnet ring stationarily mounted and having a friction face adapted for axial gripping engagement with said ring face when the magnet is energized whereby to produce a friction drag on said second disk.

ARTHUR P. WARNER.

REFERENCES CITED

The following references are of record in the file of this patent:

UNITED STATES PATENTS

| Number | Name | Date |
| --- | --- | --- |
| 2,061,787 | Warner | Nov. 24, 1936 |
| 2,091,270 | Colman | Aug. 31, 1937 |

FOREIGN PATENTS

| Number | Country | Date |
| --- | --- | --- |
| 599,462 | Great Britain | Mar. 12, 1948 |